United States Patent [19]
Weinlaender

[11] Patent Number: 6,112,985
[45] Date of Patent: Sep. 5, 2000

[54] LICENSE-CARD-CONTROLLED CHIP CARD SYSTEM

[75] Inventor: Markus Weinlaender, Happurg, Germany

[73] Assignee: Siemens Aktiengesellschaft, Munich, Germany

[21] Appl. No.: 08/913,213
[22] PCT Filed: Mar. 7, 1996
[86] PCT No.: PCT/DE96/00422
  § 371 Date: Jan. 16, 1998
  § 102(e) Date: Jan. 16, 1998
[87] PCT Pub. No.: WO96/28793
  PCT Pub. Date: Sep. 19, 1996
[51] Int. Cl.[7] .................................................. G06K 5/00
[52] U.S. Cl. ............................................ 235/380; 235/492
[58] Field of Search .................................. 235/380, 492, 235/382.5

[56] References Cited

U.S. PATENT DOCUMENTS

| | | | |
|---|---|---|---|
| 4,542,465 | 9/1985 | Stockburger et al. | 364/468.24 |
| 4,742,215 | 5/1988 | Daughters et al. | 235/487 |
| 4,801,862 | 1/1989 | Osaki et al. | 324/631 |
| 4,855,578 | 8/1989 | Hirokawa et al. | |
| 5,311,595 | 5/1994 | Bjerrum et al. | 380/25 |
| 5,629,508 | 5/1997 | Findley, Jr. et al. | 235/382 |
| 5,644,638 | 7/1997 | Thiriet | 380/25 |
| 5,774,546 | 6/1998 | Handelman et al. | 380/4 |

FOREIGN PATENT DOCUMENTS

| | | |
|---|---|---|
| 0 574 219 | 12/1993 | European Pat. Off. . |
| 0 593 244 | 4/1994 | European Pat. Off. . |
| 0 636 998 | 2/1995 | European Pat. Off. . |
| 30 41 393 | 5/1984 | Germany . |
| 90/05960 | 5/1990 | WIPO . |
| 92/08211 | 5/1992 | WIPO . |

OTHER PUBLICATIONS

José Luis Zoreda and José Manuel Otón, Smart Cards Artec House, Inc., 1994, pp. 97–98, and 123–127.

*Primary Examiner*—Donald Hajec
*Assistant Examiner*—Mark Tremblay
*Attorney, Agent, or Firm*—Kenyon & Kenyon

[57] ABSTRACT

A chip card system, whose chip cards (AK, LK) have in each case at least one internal processor (P) and a non-volatile memory (S) at least for an operating system of the processor (P). There are a multiplicity of user chip cards (AKn) whose processors (P) can in each case execute user command instructions only after an activation, and there is at least one license chip card (LK), in whose non-volatile memory (S) a limitable number of activatable user chip cards (AKn) can be managed. By means of at least one read-write station (AKg) for chip cards (LK), the activation of the internal processor (P) is effected in a user chip card (AKi) if in the memory (S) of the license chip card (LK) the number of activatable user chip cards (AKn) is not yet exhausted. Thereafter, the number of activatable user chip cards (AKn) is decremented in the memory (S) of the license chip card (LK).

8 Claims, 2 Drawing Sheets

LICENSE-CARD-CONTROLLED CHIP CARD SYSTEM

FIELD OF THE INVENTION

The present invention relates to a chip card system, in particular, a system which is controlled by a license card.

BACKGROUND INFORMATION

Chip cards are increasingly being used in a wide variety of areas of daily life. Therefore a very great number of such cards are in circulation. Usually, many measures are taken to avoid pecuniary losses, in particular for the respective card owner, once the chip card has been issued, i.e. during normal use. For example, after the loss of a card, at least, unauthorized use of the card by any third party must be prevented.

Owing to the increasing numbers in distribution, however, measures must also be taken on the one hand to protect, in particular, sizeable batches of cards already before they are individually issued to final customers, and on the other hand to monitor or limit the quantity of cards legally issued to final customers or the quantity of cards which can be issued as a maximum, for example for a period of time, or an amount of remuneration currently paid to a licensor or service provider.

For example, cards are sent in sometimes very large quantities by a card manufacturer to a distributor of cards, for example to a financial institution. This transfer is comparable to the transportation of large amounts of money between banks and is consequently subject to corresponding risks. Furthermore, it is often desirable on the part of the distributor of cards to monitor, document and limit exactly the number of cards which can be issued, for example per employee, to final customers in order to rule out as far as possible the risk of misuse. Since handing over a card to a final customer generally makes it possible for the latter to make use of services, considerable pecuniary losses can be caused by chip cards which are brought into circulation impermissibly, sometimes in quite a large quantity.

The document DE 30 41 393 C2 describes a method of producing a predetermined number of authorization cards having a storage medium. By means of a master card and a first activation station, a limited number of authorization cards is activated. The activation of authorization cards is performed only if the number of activatable authorization cards which is stored in the memory of the master card has not yet been exhausted. After each activating operation, the number of activatable authorization cards is decremented in the memory of the master card. In addition, in the authorization cards there may be a supplemental scope of authorization whereby a predetermined number of additional cards can be activated by a second activation station.

SUMMARY OF THE INVENTION

An object of the present invention is to provide a card system with the highest possible data and falsification security for producing a predetermined number of chip cards.

The aforementioned object is achieved by a chip card system with chip cards which each have at least one internal processor and a non-volatile memory for holding at least an operating system of the processor. The system includes at least one read-write station for chip cards, a multiplicity of user chip cards, whose processors can each execute user command instructions only after an activation, and at least one license chip card, in whose non-volatile memory a limitable number of activatable user chip cards can be managed. In the system of the present invention, for initiation of an activation, a random number is generated by the processor of a user chip card and is transmitted by means of the read-write station to the license chip card. In the event that the number of activatable user chip cards in the memory of the license chip card is not yet exhausted, an enabling identification dependent on the respective random number is generated by the processor of the license chip card and is transmitted by means of the read-write station to the user chip card. The enabling identification is checked by the processor of the user chip card for correspondence with the random number. If there is a positive outcome of the check, an activation of the entire set of permissible user command instructions is effected, and the number of activatable user chip cards in the memory of the license chip card is decremented.

DETAILED DESCRIPTION

Figure 1:
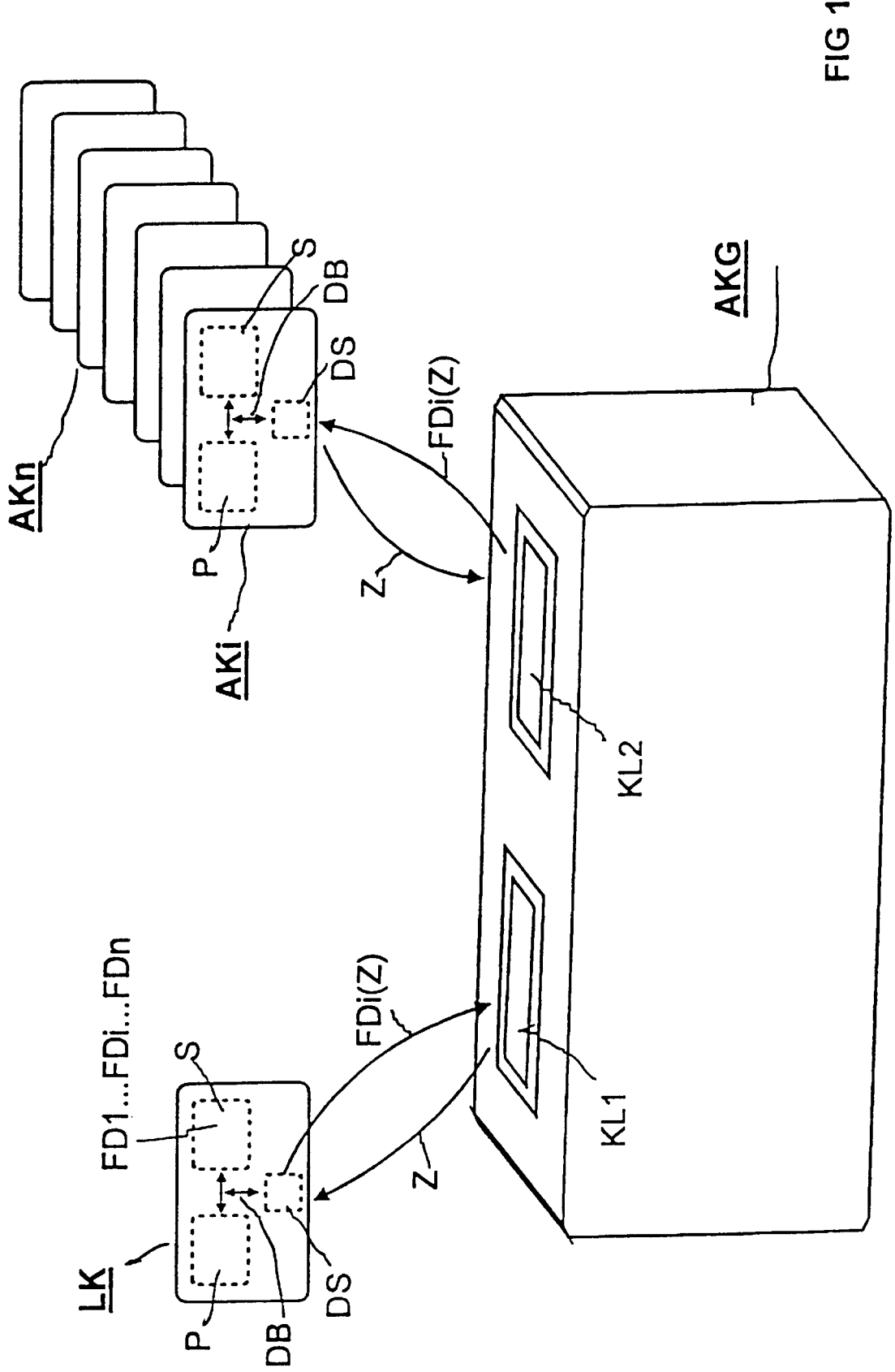
FIG. 1 is a block diagram of a chip card system in accordance with the present invention.

The chip card system according to the present invention has in principle two types of chip cards. First, there is generally a very large number of "user chip cards" AKn. In the example of FIG. 1, some of these are shown as fanned-out cards at the top right, with further explanation of the user chip card AKi represented in the foreground. It is essential for the present invention that there is a further chip card type, which has the function of an activating card and is to be referred to in the following as a "license card". There are, of course, only very few cards of this chip card type in the possession of selected, specially authorized persons. It is even possible that there is only one such card in circulation. In the example of FIG. 1, such a license chip card LK is represented at the top left.

Advantageously, all the cards of the chip card system are identical in terms of hardware, and differ in the type of the particular user program used. This simplifies the manufacture of the chip cards of the system considerably. Accordingly, in the example of FIG. 1, both the user chip cards AKi and the, by way of example, one license chip card LK have the same hardware elements. These are essentially in each case an internal processor P, a non-volatile memory S, at least for receiving an operating system of the processor P, an interface DS for data exchange with a read-write station AKG, which may for example be configured in the form of a contact area for wired data exchange or in the form of an aerial for wire-free data exchange, and a chip card-internal data bus DB.

According to the present invention, the user chip cards AKn are organized in such a way that their processor P can in each case only execute user command instructions after an activation, while in the non-volatile memory S of the at least one license card LK, a limitable number of activatable user chip cards AKn can be handled. Finally, the chip card system according to the invention has at least one read-write station AKG for chip cards LK or AKn, by means of which station the activation of the internal processor P is brought about in a user chip card AKi if in the memory S of the license card LK the maximum number of activatable user chip cards AKn is not yet exhausted. After a successful activation, in the memory S of the licensed chip card LK a decrementing of the number of activatable user chip cards AKn is in turn brought about with the aid of the read-write station AKG.

For the data exchange between a license chip card LK and a user chip card AK currently to be processed, in the case of wireless data transmission, for example, both chip cards must be brought into the transmitting range of the read-write station AKG. In the case of wired data exchange, it may be necessary to introduce the chip cards into the read-write station AKG and withdraw them, sometimes alternately several times in succession. In the case of the configuration represented in FIG. 1, the read-write station AXG has, for example, two card-reading units. The first card-reading unit KL1 serves for receiving the license chip card LK, while the second card-reading unit KL2 serves for receiving a user chip card AKi. In such a case, it is advantageous that chip cards do not have to be changed in order to activate a user chip card.

In the case of a preferred embodiment of the invention, for initiating an activation, a random number Z is first generated by the processor P of a user chip card AKi and is transmitted by means of the read-write station AKG to the license chip card LK. Such a case is represented in the Example of FIG. 1 with the aid of curved arrows, which indicate the respective direction of the data transfer between the data interface DS of the respective chip card and the read-write station AKG. For instance, a random number Z is read from the user chip card AKi by means of the card-reading unit KL2, and is loaded by means of the card-reading unit KL1 into the memory S of the license chip card LK.

Then, in the event that the number of activatable chip cards AKn, which is contained in the non-volatile memory S, is not yet exhausted, an enabling identification FDi (Z), dependent on the respective random number, is generated by the processor P of the license chip card LK, is loaded by means of the card-reading unit KU into the read-write station AKG and is finally written back by means of the card-reading unit KL2 into the user chip card AKi. The enabling identification FDi is checked by the processor P of the user chip card AKi for correspondence with the random number, and, if there is a positive outcome of the check, an activation of the entire set of permissible user command instructions is effected. In the event that the number of activatable user chip cards has been used up, the license chip card either transmits no enabling identification or transmits an invalid enabling identification, i.e. combined with the random number in an impermissible way for example, to the requesting user chip card.

Therefore, in the case of this configuration of the invention, the user chip cards AKn activate themselves after successful reception of a permissible enabling identification.

Therefore, the system of the present invention has the dual advantage that on the one hand user chip cards are entirely unusable before an activation, and on the other hand the activation of user chip cards can be monitored within a narrowly limitable framework with the aid of the system of the license chip card.

In the case of another configuration of the chip card system according to the invention, the activation of a user chip card AKi is carried out by transmission of an enabling data set, required by the operating system for the execution of user command instructions, into the nonvolatile memory of the user chip card AKi via the read-write station AKG. In this case, the user chip cards are not capable of activating themselves. Rather, the enabling data set is essential for achieving full operability.

Once again, in this case, for initiating an activation, a request for transfer of an enabling data set FDi is advantageously transmitted by the processor P of a user chip card AKi first by means of the read-write station AK to the license chip card (LK). Then, in the event that the number of activatable user chip cards AKn in the non-volatile memory S is not yet exhausted, an enabling data set FDi is called or generated by the processor P of the license chip card LK and is in turn transmitted by means of the read-write station AKG to the user chip card AKi. Finally, to permit operation of the entire set of permissible user command instructions of the operating system, the said enabling data set is properly linked by the processor P of the user chip card AKi into the non-volatile memory S containing at least the operating system of the user chip card AKi.

In the case of this configuration of the invention, security with respect to impermissible manipulations is further improved since the user chip cards are not capable of operating in any data handling way and consequently cannot be activated in an unauthorized way without an enabling data set, if appropriate additionally individualized for the respective user chip card.

This configuration of the chip card system according to the invention is explained in more detail below with reference to the example of FIG. 2. In this case, a command table KTB, specific to the operating system, in the non-volatile program memory S of the processor, preferably serves as the enabling data set, whereby the assignment adr 1 . . . adr k . . . adr n of user command instructions AWBx to the parts of the operating system BSC of the user chip card AKi respectively executing the said instructions is established.

In addition to this, it may be advantageous if the internal processor P and a non-volatile program memory S, serving for receiving an operating system for the operation of the processor P, and beyond this in turn, if appropriate, further functional elements of the user chip card, such as for example energy supply, data interface for the exchange of data between the chip card and external read and write stations and the like, are matched to each other in such a way that, after its manufacture, the user chip card can execute a command instruction only when it is brought into data-handling connection with a read-write station for the first time. This command instruction effects the reloading of a command table specific to the operating system into the non-volatile memory of the processor. Only after successful completion of this loading operation is it possible to assign further user command instructions, supplied to the user chip card, in particular via external read-write stations, to the respective operating system parts provided for their execution. The execution of the command instructions necessary for proper operability of the chip card, with respect to all maximum possible operations during normal use, is consequently not possible until the command table has been linked in.

This configuration offers the advantage that, under certain circumstances, even very large quantities of newly manufactured chip cards are virtually completely unusable. They are instead usually rendered usable separately for each individual chip card only immediately before they are passed on to the authorized end user. Newly manufactured chip cards, in whose non-volatile memory or other memory areas the coding of the successive operating system command instructions is indeed loaded, are not operable because, due to the missing command table, incoming user command instructions cannot be identified and the operating system part or parts required for their execution cannot be activated owing to the absence of the associated branch addresses. In practice, it is virtually impossible with reasonable expenditure, in terms of time and means, to reconstruct the functional structure of the operating system by way of a kind of reverse engineering in such a way that the parts necessary for the execution of individual user command instructions and their possible interactions, in the form of entry addresses, become accessible.

The design of a user chip card, according to this configuration of the invention, offers the advantage that, before its authorization by reloading the command table usually directly before passing-on into the possession of the new user, the chip card is protected against virtually any type of unauthorized use, without complex measures having to be provided in the hardware or software area of the chip card, which would make manufacture of the chip card more expensive and possibly restrict its serviceability. On the one hand, it is possible to simply upgrade the chip card so that it will be able to exclusively execute the loading command for the command table. On the other hand, the reloading of the command table does not present any problems in terms of data handling for an institution legitimately in possession of the code of the command table, such as for example a bank. In this operation, if need be, any desired further data individualizing the respective chip card, for example with respect to the new user, can also be simultaneously transferred.

Apart from preventing unauthorized use of user chip cards before they are passed on for normal use, the system of the present invention also prevents the program code itself, in particular the code of the operating system, applied to the chip card during manufacture, from being viewed in an unauthorized way or being changed in an unauthorized or unprofessional way in this intermediate phase.

Figure 2:
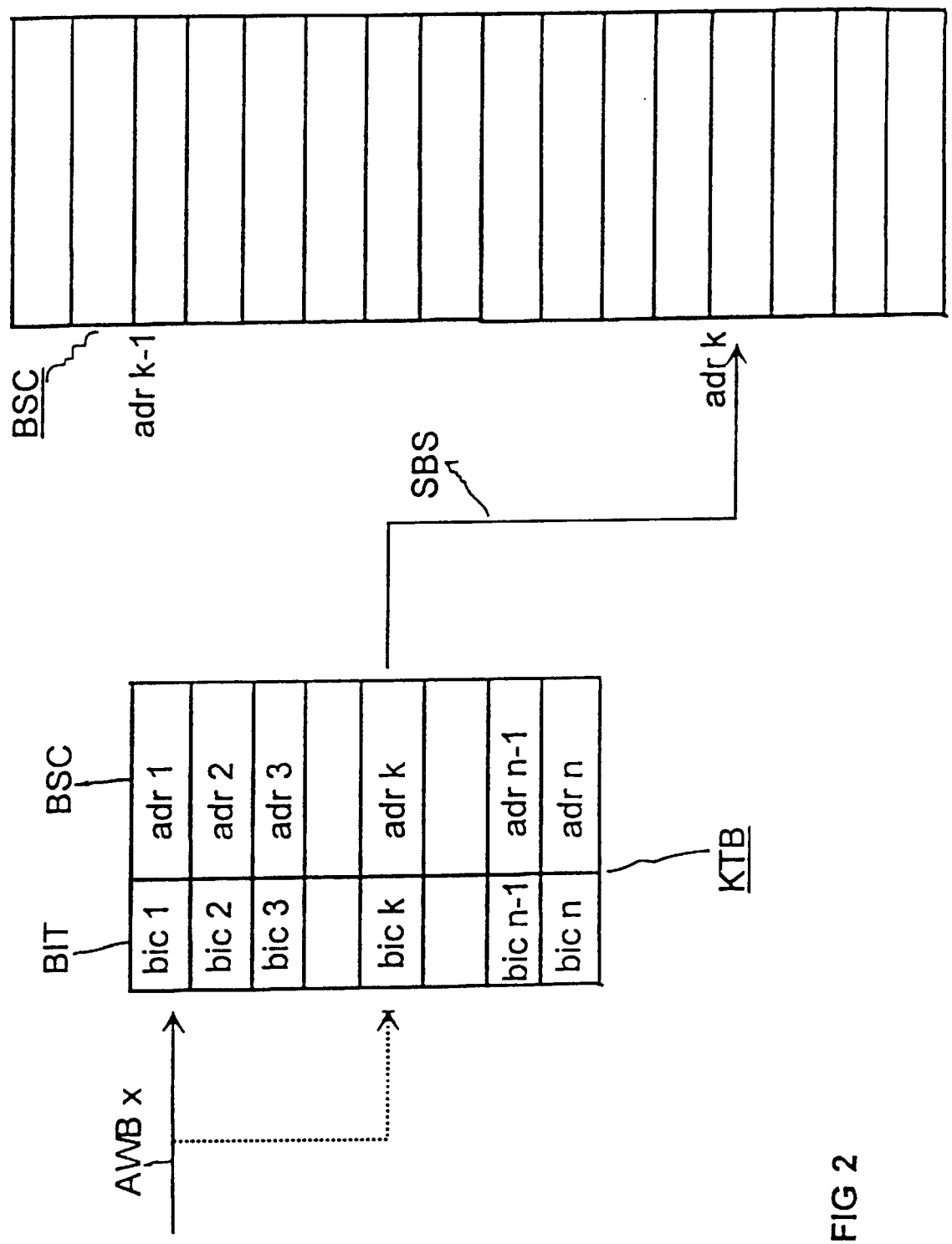
FIG. 2 shows the loading into non-volatile memory of a user chip card of an activation data set required by the operating system of the chip card to execute user command instructions, in accordance with the present invention.

For explanation, on the right-hand side of FIG. 2 there is represented, by way of example in graphic tabular form, a section from the sequence of the successive instructions of an operating system code BSC. In this case, one should visualize the table as continuing both upwards and downwards. The section shows, by way of example, a preceding entry address adr k-1 and a following entry address adr k. The line of the operating system command code assigned to one of these entry addresses and the lines of the operating system command code then following up to the next entry address form a group which effects the execution of a specific user command.

In the example of FIG. 2, the user chip card is supplied with a current user command AWB x, preferably from an external read-write station. This command is to be executed by the operating system. For this a command table KTB is required, which represents as it were a key permitting access to the functional subunits of the operating system BSC. By way of example, each line of the command table KTB comprises a first code part bic k, which serves for the interpretation, i.e. identification of the type, of the current user command AWB x, and a second code part adr k, which contains the start address of the associated operating system command sequence. The command table KTB consequently comprises a first sub-table BIT, which contains the codes serving for command interpretation, bic 1, bic 2, bic 3 . . . bic k . . . bic n-1, bic n, and a second sub-table BSC, which contains the associated entry addresses adr 1, adr 2, adr 3 . . . adr k . . . adr n-1, adr n of the corresponding operating system sequences.

In the case of the example represented in FIG. 2, a user command denoted by AWB x is supplied to the chip card. This command is identified by the coding bic k as a permissible command, which is represented in the figure by a line in dash form (broken line) on the left-hand side of the command table KTB. The associated entry address adr k is then activated and, as a result, the code of the operating system BSC is executed from the beginning at the entry address adr k. In the figure, the call-up of the operating system sequence belonging to the user command AWB x is represented by an arrow SBS running from the corresponding cell of the command table KTB to the entry address adr k. It is evident from the example of the figure that no user command AWB x can be executed without the bridge function of a command table KTB since no assignment of the user command to the associated part of the operating system is possible. This configuration of the chip card according to the invention consequently represents extraordinarily effective protection against unauthorized use of newly manufactured chip cards.

Finally, the data exchange between a user chip card AKi and the license chip card LK, by means of the read-write station AKG, may advantageously be performed in a cryptologically encoded form.

What is claimed is:
1. A chip card system comprising:
   a user chip card, the user chip card including a processor and a non-volatile memory, the non-volatile memory storing an operating system of the processor;
   a license chip card, the license chip card including a processor and a non-volatile memory, the non-volatile memory storing a number indicative of the number of user chip cards that can be activated; and
   a read-write station,
wherein:
   in order to activate the user chip card, the processor of the user chip card generates a random number which is transmitted by means of the read-write station to the license chip card,
   if the number stored in the non-volatile memory of the license chip card indicates that the number of activatable user chip cards is not yet exhausted, the processor of the user chip card generates an enabling identification as a function of the random number, and the enabling identification is transmitted via the read-write station to the user chip card,
   the enabling identification is checked by the processor of the user chip card for correspondence with the random number and if there is correspondence, a set of permissible user command instructions is activated, and
   the number stored in the non-volatile memory of the license chip card indicative of the number of activatable user chip cards is decremented.
2. The system of claim 1, wherein:
   in order to activate the user chip card, the processor of the user chip card transmits to the license chip card, via the read-write station, a request for transfer of an enabling data set,
   if the number stored in the non-volatile memory of the license chip card indicates that the number of activatable user chip cards is not yet exhausted, the processor of the license chip card generates an enabling data set, and the enabling data set is transmitted via the read-write station to the user chip card, and
   the processor of the user chip card loads the enabling data set into the non-volatile memory containing the operating system of the user chip card, thereby activating the set of permissible user command instructions of the operating system of the user chip card.

3. The system of claim 2, wherein the enabling data set includes a command table specific to the operating system stored in the non-volatile program memory of the user chip card, the command table establishing an assignment of user command instructions to respective parts of the operating system of the user chip card which execute said user command instructions.

4. The system of claim 1, wherein hardware of the license chip card and hardware of the user chip card are identical.

5. The system of claim 1, wherein data exchanged between the user chip card and the license chip card via the read-write station is in a cryptologically encoded form.

6. A chip card system comprising:

a user chip card, the user chip card including a processor and a non-volatile memory, the non-volatile memory storing an operating system of the processor;

a license chip card, the license chip card including a processor and a non-volatile memory, the non-volatile memory storing a number indicative of the number of user chip cards that can be activated; and a read-write station, wherein:

the user chip card is activated by transmission of a command table specific to an operating system of the user chip card into the non-volatile memory of the user chip card if the number stored in the non-volatile memory of the license chip card indicates that the number of activatable user chip cards is not yet exhausted, the command table establishing an assignment of user command instructions to respective parts of the operating system of the user chip card which execute said user command instructions, and the number stored in the non-volatile memory of the license chip card indicative of the number of activatable user chip cards is decremented.

7. The system of claim 6, wherein hardware of the license chip card and hardware of the user chip card are identical.

8. The system of claim 6, wherein data exchanged between the user chip card and the license chip card via the read-write station is in a cryptologically encoded form.

* * * * *